US011981017B2

(12) United States Patent
Beer

(10) Patent No.: US 11,981,017 B2
(45) Date of Patent: May 14, 2024

(54) RATCHET WITH TOGGLE TRIGGER

(71) Applicant: Snap-on Incorporated, Kenosha, WI (US)

(72) Inventor: Joshua M. Beer, Kenosha, WI (US)

(73) Assignee: Snap-on Incorporated, Kenosha, WI (US)

( * ) Notice: Subject to any disclaimer, the term of this patent is extended or adjusted under 35 U.S.C. 154(b) by 456 days.

(21) Appl. No.: 17/308,352

(22) Filed: May 5, 2021

(65) Prior Publication Data

US 2022/0355459 A1 Nov. 10, 2022

(51) Int. Cl.
*B25F 5/02* (2006.01)
*B25B 21/00* (2006.01)

(52) U.S. Cl.
CPC .............. *B25F 5/02* (2013.01); *B25B 21/004* (2013.01)

(58) Field of Classification Search
CPC ... B25B 21/004; B25B 13/465; B25B 13/462; B25B 13/463; B25F 5/02
See application file for complete search history.

(56) References Cited

U.S. PATENT DOCUMENTS 951,056 A 3/1910 Clark
4,277,989 A 7/1981 Tracy
4,346,630 A 8/1982 Hanson
4,445,404 A 5/1984 Parker
4,589,307 A 5/1986 Parker
4,974,475 A 12/1990 Lord et al.
5,231,901 A * 8/1993 Putney .................. B25B 21/004 81/57.39
5,537,899 A * 7/1996 Diedrich ............... B25B 21/004 81/62
5,584,220 A 12/1996 Darrah et al.
6,102,632 A 8/2000 Potter et al.
(Continued)

FOREIGN PATENT DOCUMENTS

DE 102008033678 1/2010
EP 0278649 A2 8/1988
(Continued)

OTHER PUBLICATIONS

United Kingdom Office Action for corresponding UK Application No. GB2206501.5, dated Nov. 15, 2022, 10 pages.
(Continued)

*Primary Examiner* — David B. Thomas
(74) *Attorney, Agent, or Firm* — Seyfarth Shaw LLP

(57) ABSTRACT

A reversing mechanism for a motorized hand-held ratcheting tool. A toggle trigger is coupled to a reversing mechanism of the tool, and a rotational drive direction of the tool is controlled via the trigger instead of a separate knob or dial. For example, when the trigger is rotated or pivoted in a forward direction (depression of a bottom or back of the trigger), the reversing mechanism is rotated into a right hand threaded fastener's tightening direction, and when the trigger is rotated or pivoted in a reverse direction (depression of a top or front of the trigger), the reversing mechanism is rotated into a right hand threaded fastener's loosening direction. The motor's rotational direction is not changed by the toggle trigger, but the trigger does control the rotational drive direction of the tool and activates the motor and variable speed circuitry.

15 Claims, 5 Drawing Sheets

(56) References Cited

U.S. PATENT DOCUMENTS

| | | | | |
|---|---|---|---|---|
| 6,296,427 | B1 | 10/2001 | Potter et al. | |
| 6,330,842 | B1 | 12/2001 | Brun | |
| 6,461,088 | B2 | 10/2002 | Potter et al. | |
| 6,481,316 | B1 | 11/2002 | Liao | |
| 6,568,298 | B1 | 5/2003 | Zinck | |
| 6,640,669 | B2 | 11/2003 | Izumisawa | |
| 6,789,447 | B1 | 9/2004 | Zinck | |
| 6,948,405 | B1 | 9/2005 | Simmons | |
| 7,121,167 | B1 | 10/2006 | Miner | |
| 7,458,295 | B1 * | 12/2008 | Lu | B25B 21/004 81/63 |
| 8,051,746 | B2 | 11/2011 | Bouchard et al. | |
| 8,319,379 | B2 | 11/2012 | Onose et al. | |
| 8,375,828 | B2 | 2/2013 | Chen | |
| 8,499,853 | B2 | 8/2013 | Spirer | |
| 8,757,031 | B2 | 6/2014 | Su | |
| 8,844,408 | B2 * | 9/2014 | Chen | B25B 21/004 81/57.39 |
| 9,010,509 | B2 | 4/2015 | Kobayashi | |
| 9,038,504 | B2 | 5/2015 | Pusateri | |
| 9,120,213 | B2 | 9/2015 | Elger | |
| 9,132,532 | B2 * | 9/2015 | Arnold | B25B 13/463 |
| 9,360,060 | B2 | 6/2016 | Su | |
| 9,381,625 | B2 * | 7/2016 | Chen | B25B 21/00 |
| 9,701,006 | B2 | 7/2017 | Borst | |
| 10,016,880 | B2 * | 7/2018 | Chung | B25B 13/463 |
| 10,625,405 | B2 | 4/2020 | Silha et al. | |
| 11,364,603 | B2 * | 6/2022 | Liu | B25B 21/004 |
| 11,413,731 | B2 * | 8/2022 | Banholzer | B25B 21/004 |
| 11,691,253 | B2 * | 7/2023 | Banholzer | B25B 21/004 81/57.39 |
| 2013/0255448 | A1 | 10/2013 | Lai | |
| 2014/0020516 | A1 | 1/2014 | Liu et al. | |
| 2014/0202287 | A1 | 7/2014 | Lai et al. | |
| 2014/0262394 | A1 * | 9/2014 | Scott | B25B 23/0007 173/48 |
| 2014/0305264 | A1 * | 10/2014 | Dohogne | B25B 13/467 81/57 |
| 2015/0266171 | A1 | 9/2015 | Lai et al. | |
| 2019/0275647 | A1 | 9/2019 | Banholzer et al. | |
| 2020/0039035 | A1 | 2/2020 | Nick | |
| 2020/0061782 | A1 | 2/2020 | Banholzer et al. | |
| 2020/0130150 | A1 | 4/2020 | Nick et al. | |
| 2020/0215666 | A1 | 7/2020 | Schultz | |
| 2021/0060739 | A1 | 3/2021 | Chiang | |
| 2021/0094156 | A1 | 4/2021 | Chung et al. | |

FOREIGN PATENT DOCUMENTS

| | | | |
|---|---|---|---|
| EP | 2711133 | | 3/2014 |
| IN | 108430703 | B | 1/2021 |
| JP | 863100155 | U | 6/1988 |
| JP | 3248296 | | 1/2002 |
| TW | I319733 | B | 1/2010 |
| TW | 202108309 | A | 3/2021 |
| TW | I724902 | B | 4/2021 |
| WO | 2021236773 | A1 | 11/2021 |

OTHER PUBLICATIONS

Examination Report No. 1 for corresponding Application No. 2022202579 dated Jun. 7, 2023, 5 pages.

Examination Report for corresponding Application No. GB2206501.5 dated Jul. 27, 2023, 4 pages.

Taiwan Office Action for corresponding Application No. 11220143680 dated Feb. 15, 2023, 8 pages.

* cited by examiner

RATCHET WITH TOGGLE TRIGGER

TECHNICAL FIELD OF THE INVENTION

The present invention relates generally to power tools. More specifically, the present invention relates to reversing mechanisms for hand-held power ratchets.

BACKGROUND OF THE INVENTION

Power tools, such as, for example, motorized ratchet wrenches, drills, and drivers, driven by electric or pneumatic motors are commonly used in automotive, industrial, and household applications to tighten and untighten work pieces, such as threaded fasteners, and to apply a torque and/or angular displacement to a work piece, for example. Power tools such as cordless power ratchets and drivers generally include an electric motor contained in a housing, along with other components, such as switches, light emitting diodes (LEDs), and batteries, for example. The housing may be a clamshell type housing that generally includes two or more housing portions coupled together by fasteners such as screws or rivets to cooperatively form the housing.

Conventional power ratchets have a reversing mechanism, such as a reversing switch, that is on a head of the ratchet, away from the operator's hand. This placement makes it difficult for the operator to reverse the tool during use, if the tool's ratchet reversing mechanism is blocked by obstructions, such as in tight spaces in a vehicle engine bay, etc.

SUMMARY OF THE INVENTION

The present invention relates broadly to reversing mechanisms for a motorized hand-held ratcheting tool. A toggle trigger is coupled to a reversing mechanism, and a rotational drive direction of the tool is controlled via the trigger instead of a separate knob or dial. Rotation or pivoting of the toggle trigger actuates the reversing mechanism to select the rotational drive direction of the tool, and further travel of the trigger controls motor speed. For example, when the trigger is rotated or pivoted in a forward direction (for example, depression of a bottom or back of the trigger), the reversing mechanism is rotated into a right hand threaded fastener's tightening direction, and when the trigger is rotated or pivoted in a reverse direction (depression of a top or front of the trigger), the reversing mechanism is rotated into a right hand threaded fastener's loosening direction. The motor's rotational direction is not changed by the toggle trigger, but the trigger does control the rotational drive direction of the tool and activates the motor and variable speed circuitry.

In an embodiment, the present invention broadly comprises a reversing mechanism for a tool. The mechanism includes a ratchet mechanism and a toggle trigger operably coupled to the ratchet mechanism. The toggle trigger is rotatable in first and second directions, wherein rotation of the toggle trigger in the first direction causes the ratchet mechanism to select a first rotational drive direction, and rotation of the toggle trigger in the second direction causes the ratchet mechanism to select a second rotational drive direction.

In an embodiment, the present invention broadly comprises a tool. The tool includes a ratchet mechanism, a motor operably coupled to the ratchet mechanism and adapted to rotate in a first rotational direction, and a toggle trigger operably coupled to the motor and ratchet mechanism. The toggle trigger is rotatable in first and second directions, wherein initial rotation of the toggle trigger in the first direction causes the ratchet mechanism to select a first rotational drive direction, and further rotation of the toggle trigger in the first direction causes the motor to rotate in the first rotational direction. Similarly, initial rotation of the toggle trigger in the second direction causes the ratchet mechanism to select a second rotational drive direction, and further rotation of the toggle trigger in the second direction causes the motor to rotate in the first rotational direction.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION OF THE INVENTION

Figure 1:
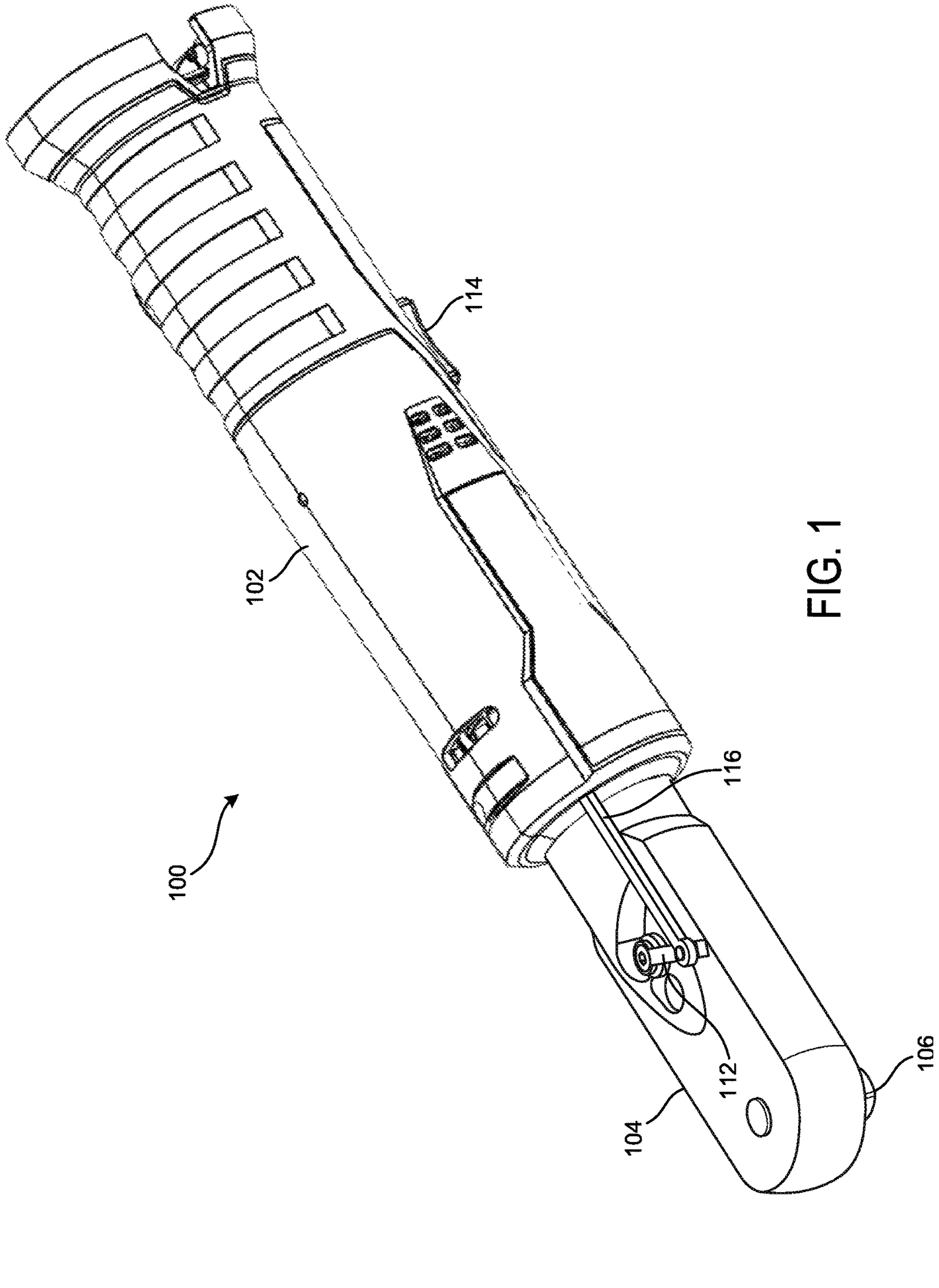
FIG. 1 is a perspective view of an exemplary power hand-tool, such as a motorized ratchet tool, that includes toggle trigger according to an embodiment of the present invention.

While the present invention is susceptible of embodiments in many different forms, there is shown in the drawings, and will herein be described in detail, embodiments of the invention, including a preferred embodiment, with the understanding that the present disclosure is to be considered as an exemplification of the principles of the present invention and is not intended to limit the broad aspect of the invention to any one or more embodiments illustrated herein. As used herein, the term "present invention" is not intended to limit the scope of the claimed invention, but is instead used to discuss exemplary embodiments of the invention for explanatory purposes only.

The present invention relates broadly to reversing mechanisms for a motorized hand-held ratcheting tool. A toggle trigger is coupled to a reversing mechanism, and a rotational drive direction of the tool is controlled via the trigger instead of a separate knob or dial. Rotation or pivoting of the toggle trigger actuates the reversing mechanism to select the rotational drive direction of the tool, and the further travel of the trigger controls motor speed. For example, when the trigger is rotated or pivoted in a forward direction (for example, depression of a bottom or back of the trigger), the reversing mechanism is rotated into a right hand threaded fastener's tightening direction, and when the trigger is rotated or pivoted in a reverse direction (for example, depression of a top or front of the trigger), the reversing mechanism is rotated into a right hand threaded fastener's loosening direction. The motor's rotational direction is not changed by the toggle trigger, but the trigger does control the rotational drive direction of the tool and activates the motor and variable speed circuitry.

Figure 2:
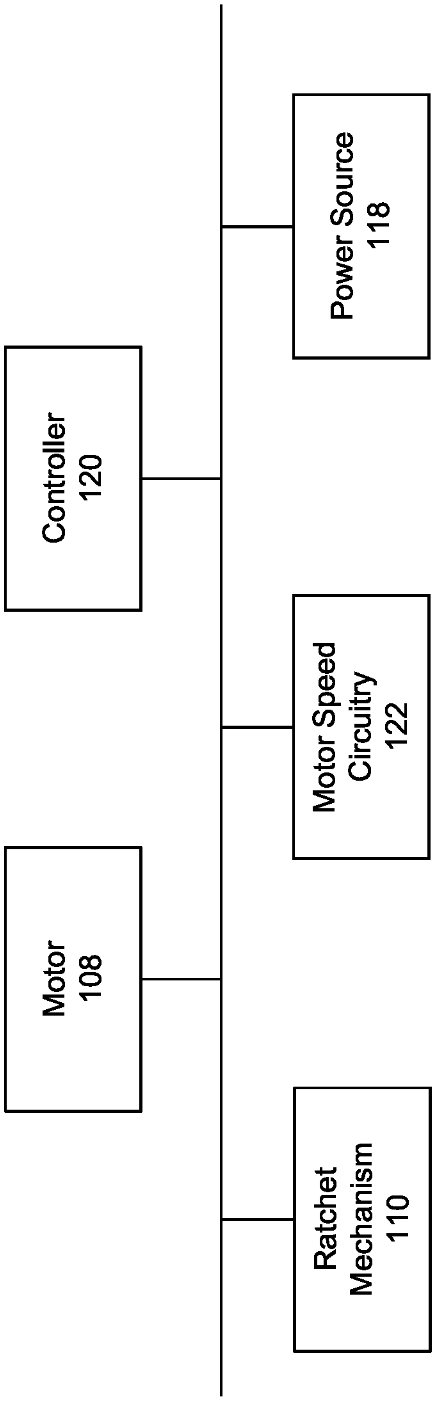
FIG. 2 is a block diagram of component of the tool according to an embodiment of the present invention.

Referring to FIGS. 1 and 2, an exemplar power tool 100, such as, for example, a motorized hand held ratcheting tool, includes a housing portion 102 adapted to be held by a user and a driver portion 104 coupled to the housing portion 102. The driver portion 104 may include a drive lug 106 adapted to apply torque to a work piece, such as a fastener, via an adapter, bit, or socket coupled to the drive lug 106, such as a bi-directional ratcheting square or hexagonal drive. As illustrated, the drive lug 106 is a "male" connector designed to fit into or matingly engage a female counterpart. However, the drive lug 106 may alternately include a "female" connector designed to matingly engage a male counterpart. The driver portion 104 may also be structured to directly engage a work piece without requiring coupling to an adapter, bit, or socket.

The drive lug 106 is operatively coupled to and driven by a pneumatic or electric motor 108 via a ratchet mechanism 110 of the driver portion 104, described in further detail below. The driver portion 104 may also include a selector lever 112 adapted to select a desired rotational drive direction of the drive lug 106 (i.e., clockwise or counter-clockwise). A toggle trigger 114 of the tool 100 is operably coupled to a reversing mechanism (via the selector lever 112 or cam of the reversing lever) via a linkage 116. This allows the rotational drive direction to be controlled via operation of the trigger 114, as described in further detail below.

In an embodiment, the housing portion 102 is assembled from two or more clamshell housing portions coupled together to cooperatively form the housing portion 102 and couple to the driver portion 104, thereby enclosing components within the housing portion 102. The housing portion 102 may also include or form a grip for a user to hold during operation of the tool 100.

The housing portion 102 operably houses components of the tool 100, such as, for example, one or more of the motor 108 adapted to drive the drive lug 106, the trigger 114 adapted to actuate the motor 108, a power source 118 adapted to provide power to the motor 108, such as, for example, a battery. The housing portion 102 may also house a controller 120 and/or motor speed circuitry 122 (which may be variable speed circuitry), which may be part of the controller 120 or separate circuitry.

The motor 108 can be operably coupled to the power source 118, motor speed circuitry 122, and/or controller 120 via the trigger 114 in a well-known manner, and operably coupled to the driver portion 104 to provide torque to the tool 100 and, in turn, to the drive lug 106. The motor 108 may be a brushless or brushed type motor, or any other suitable motor.

In an embodiment, the power source 118 can be housed in an end of the tool housing 102, opposite the driver portion 104, a midsection of the tool 100, or any other portion of the tool 100/tool housing 102. The power source 118 may also be an external component that is not housed by the tool 100, but that is operatively coupled to the tool 100 through, for example, wired or wireless means. In an embodiment, the power source 118 is a removable and rechargeable battery that is adapted to be disposed in the end of the tool housing 102 and electrically couple to corresponding terminals of the tool 100.

The trigger 114 can be adapted to selectively cause power to the motor 108 to be turned ON and OFF, or cause electric power/voltage to flow from the power source 118 to the motor 108 or cease flow from the power source 118 to the motor 108. The trigger 114 can be an actuation mechanism that employs a pivoting or rotating type toggle actuator or other type of actuator. For example, the user can depress the trigger 114 to cause the trigger 114 to pivot or rotate in first or second directions to selectively cause power to be drawn from the power source 118 and cause the motor 108 to provide torque to the driver portion 104.

The trigger 110 can be biased towards a neutral position such that the trigger 114 is pivotable or rotatable in first and second directions, relative to the housing portion 102, to cause the tool 100 to operate, and releasing the trigger 114 causes the trigger 114 to move to the neutral position, relative to the housing portion 102, to cease operation of the tool 100 via the biased nature of the trigger 114. The trigger 114 may also be operably coupled to the motor speed circuitry 122 and/or controller 120. In this regard, relative actuation of the trigger 114 causes the motor 108 to operate at variable speeds the further the trigger 114 is actuated.

The trigger 114 is operably coupled to the ratchet mechanism, such as via the selector lever 112 or a cam of the ratchet mechanism. The trigger 114 can be pivoted or rotated in a first direction or forward direction (depression of a bottom or back of the trigger 114). When the trigger 114 is pivoted or rotated in the first direction, the ratchet mechanism is moved to select a first rotational drive direction or right hand threaded fastener's tightening direction. Similarly, when the trigger 114 is pivoted or rotated in the second direction, the ratchet mechanism is moved to select a second rotational drive direction or a right hand threaded fastener's loosening direction. Initial rotation or travel of the trigger 114 moves the ratchet mechanism to select the desired rotational drive direction, and further rotation or travel of the trigger 114 activates the motor 108 and controls the motor's speed via the motor speed circuitry 122.

Figure 3:
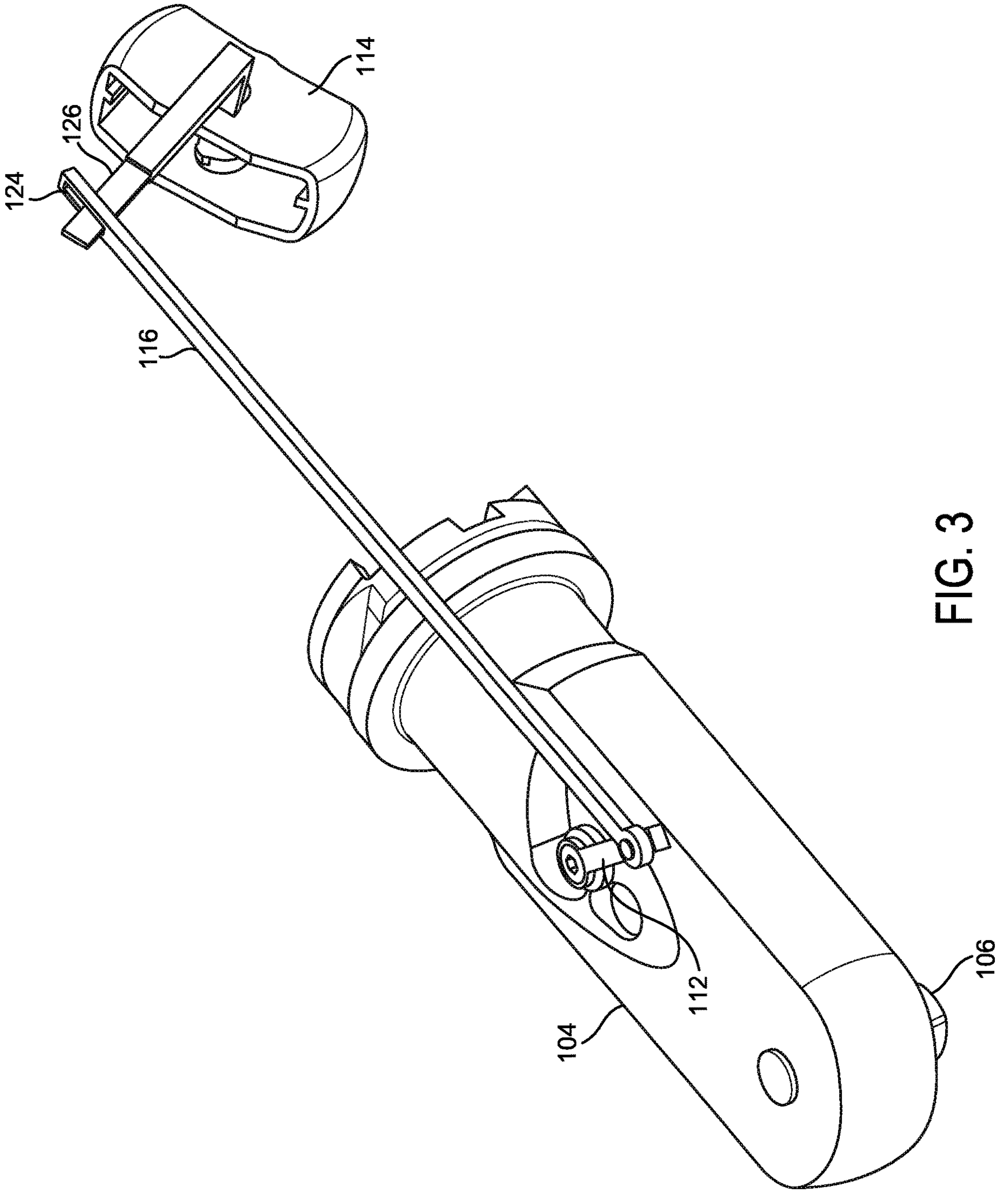
FIG. 3 is a perspective view of a trigger and driver portion for use with a tool, with the trigger operated in a first position, according to an embodiment of the present invention.
Figure 4:
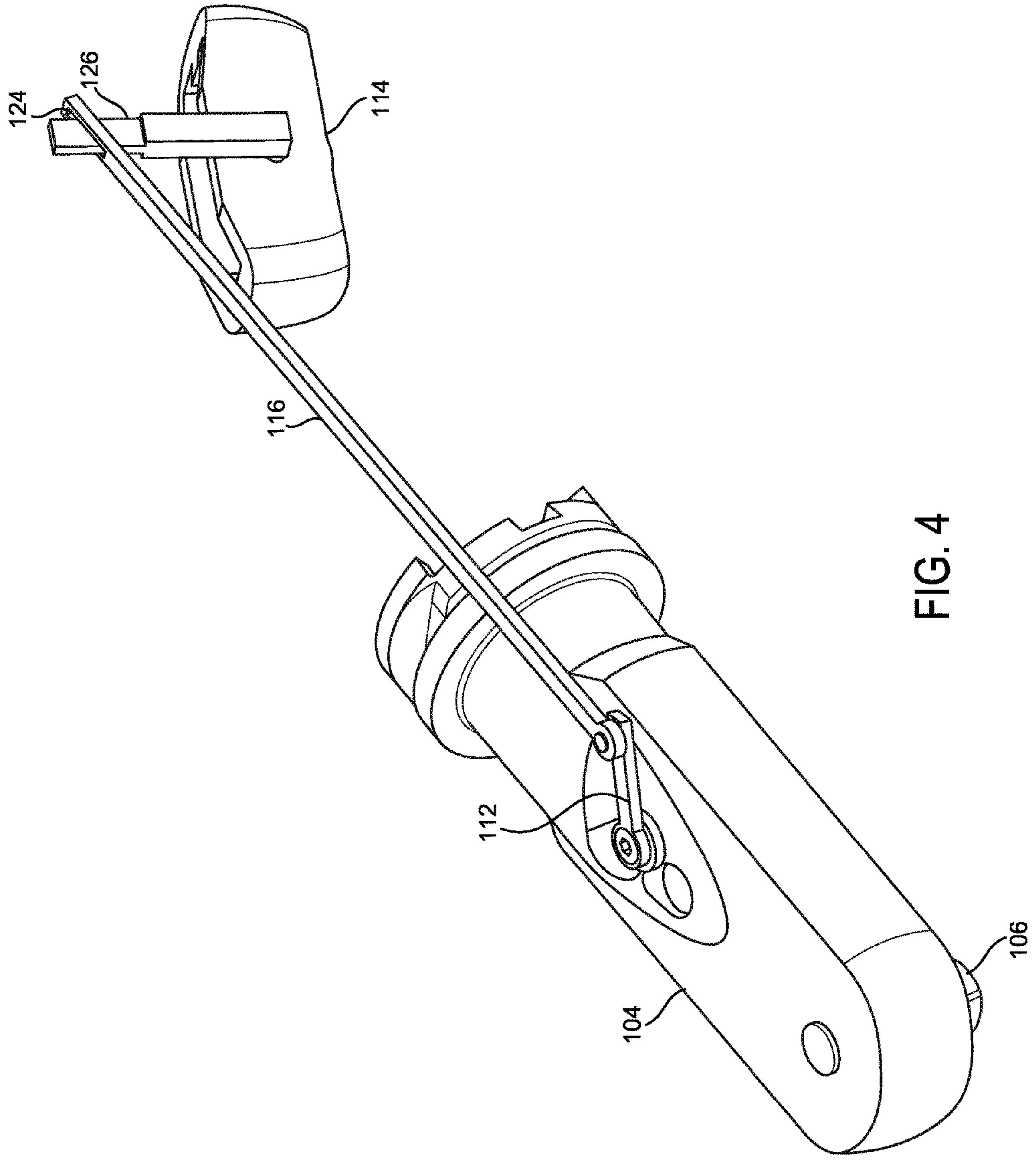
FIG. 4 is a perspective view of a trigger and driver portion for use with a tool, with the trigger operated in a second position, according to an embodiment of the present invention.

Referring to FIGS. 3 and 4, in an example, the trigger 114 is coupled to a pin-type joint and is biased towards a neutral position when the trigger 114 is not actuated. The trigger 114 is coupled to the linkage 116 at a first end of the linkage 116, and a second end of the linkage 116 is coupled to the selector lever 112 or directly to the ratchet mechanism. The linkage 116 may include a slot 124 at the first end that is adapted to receive a stem portion 126 extending from the trigger 114. The linkage may also be coupled to the selector lever 112 or directly to the ratchet mechanism (such as a cam of the ratchet mechanism) via a pin-type pivoting coupling.

Referring to FIG. 3, the trigger 114 can be pivoted or rotated in a first direction or forward direction (for example, depression of a bottom or back of the trigger 114). When the trigger 114 is pivoted or rotated in the first direction, the stem portion 126 pivots and pushes linkage 116, which causes the selector lever 112 to rotate the selector lever 112 into a first rotational drive direction or right hand threaded fastener's tightening direction. Initial rotation or travel of the trigger 114 rotates the selector lever 112, and further rotation or travel of the trigger 114 activates the motor 108 and controls the motor's speed via the motor speed circuitry 122. When released, the trigger 114 returns to the neutral position.

Referring to FIG. 4, the trigger 114 can be pivoted or rotated in a second direction or reverse direction (for example, depression of a top or front of the trigger 114). When the trigger 114 is pivoted or rotated in the second direction, the stem portion 126 pivots and pulls linkage 116, which pulls the selector lever 112 to rotate the selector lever 112 into a second rotational drive direction or right hand threaded fastener's loosening direction. Initial rotation or travel of the trigger 114 rotates the selector lever 112, and further rotation or travel of the trigger 114 activates the motor 108 and controls the motor's speed via the motor speed circuitry 122. When released, the trigger 114 returns to the neutral position.

Pivoting or rotating the trigger 114 in the first and second directions does not change a rotational direction of the motor 108. However, pivoting or rotating the trigger 114 in the first and second directions does control the rotational drive direction of the ratchet mechanism and drive lug 106, and activates the motor 108 via the motor speed circuitry 122.

Figure 5:
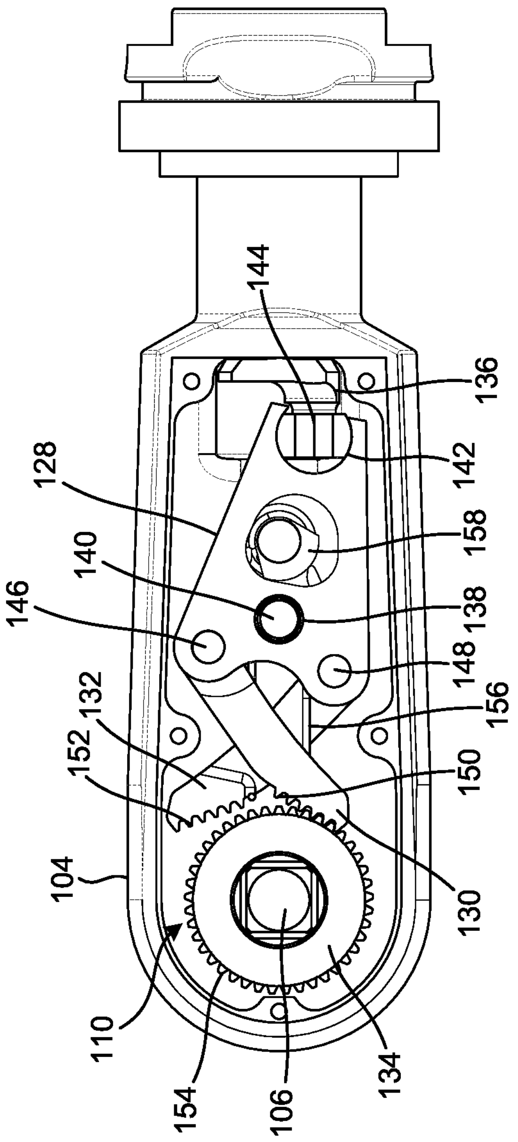
FIG. 5 is a plan view of a driver portion of the power tool of FIG. 1 with a cover removed to view an embodiment of a ratchet mechanism of the present invention.

Referring to FIG. 5, the ratchet mechanism 110 is disposed in the driver portion 104. The ratchet mechanism includes a link member 128, first 130 and second 132 pawls, a ratchet gear 134, and a crank shaft 136. The ratchet mechanism operably couples the drive lug 106 to the motor 108 to be driven thereby when the trigger 114 is actuated.

The link member 128 includes an aperture 138 adapted to receive a post 140 to rotatably couple the link member 128 to the driver portion 104. The post 140 may be integrally formed with the driver portion 104. The link member 128 may also include an opening 142. In an embodiment, the opening 142 is arcuately shaped. The opening 142 is adapted to rotatably couple to a bushing 144.

The first 130 and second 132 pawls respectively include first 146 and second 148 pivot apertures adapted to each receive a pin, shaft, axle, or fastener to pivotably couple the first 130 and second 132 pawls to the link member 128. The first pawl 130 includes first pawl teeth 150, and the second pawl 132 includes second pawl teeth 152. The ratchet gear 134 includes a generally circular body portion having circumferential toothed portion 154. The drive lug 106 may be coupled to or integral with the ratchet gear 134. The toothed portion 154 selectively engages the first 150 or second 152 pawl teeth for selective engagement with one of the first 130 and second 132 pawls to provide torque drive through the drive lug 106 in either of the first and second rotational drive directions, based on a position of the selector lever 112, as described below. The first 130 and second 132 pawls are each biased towards the ratchet gear 134 by a biasing member 156, such as, for example, a spring.

The crank shaft 136 includes first and second opposing ends, and the first end includes an offset pin received by the bushing 144 disposed in the opening 142 of the link member 128. The offset pin is offset from a longitudinal axis of the crank shaft 136, and the second end is operably coupled to the motor 108 in a well-known manner.

The selector lever 112 is pivotally coupled to a cam 158, such that the cam 158 co-rotates with the selector lever 112 to selectively position one of the pawls 130, 132 into engagement with the ratchet gear 134 for selecting the torque drive direction in either of the first and second rotational drive directions (i.e., clockwise and counterclockwise). For example, to select the first rotational drive direction (right hand threaded fastener's tightening direction), as illustrated in FIG. 5, the cam 158 is rotated to abut the second pawl 132 to overcome a bias force of the biasing member 156 to disengage the second pawl teeth 152 from the toothed portion 154 of the ratchet gear 134. To select the second rotational drive direction (right hand threaded fastener's loosening direction), the cam 158 is rotated to abut the first pawl 130 to overcome the bias force of the biasing member 156 to disengage the first pawl teeth 150 from the toothed portion 154 of the ratchet gear 134.

During operation, upon actuation of the trigger 114, the drive direction is selected based on initial rotation of the trigger 114 in either of the first or second directions, and further rotation of the trigger 114 causes the motor 108 to drive the crank shaft 136 to rotate about the longitudinal axis of the crank shaft 136 to drive the link member 128 back and forth about post 140, thereby correspondingly moving the pawls 130, 132. Accordingly, one of the first and second pawls 130, 132 selectively engaged with the ratchet gear 134 will drive the drive lug 106 in the selected rotational drive direction.

Since the selector lever 112 is used to rotate the cam 158 to select the rotational drive direction, the linkage 116 may couple directly to the cam 158 instead of the selector lever 112. For example, the selector lever 112 may be removed and the linkage 116 coupled directly to the cam 158. In this embodiment, when the trigger 114 is pivoted or rotated in the first direction, the stem portion 126 pivots and pushes linkage 116, which rotates the cam 158 into a right hand threaded fastener's tightening direction. Similarly, when the trigger 114 is pivoted or rotated in the second direction, the stem portion 126 pivots and pulls linkage 116, which rotates the cam 158 into a right hand threaded fastener's loosening direction. Initial rotation or travel of the trigger 114 rotates the cam 158, and further rotation or travel of the trigger 114 activates the motor 108 and controls the motor's speed via the motor speed circuitry 122.

In another embodiment, the linkage 116 may include or be replaced by a geared mechanism that is movable by the trigger 114 to select the rotational drive direction of the tool, and/or a switch enabled/actuatable by the trigger 114 to cause a control system to select the rotational drive direction of the tool via an electromagnetic or electromechanical actuator. One electromechanical mechanism incorporates micro-switches in the trigger 114 in a position where the switches are actuated when the trigger 114 is initially rotated, which causes the ratchet mechanism to switch into the proper position before the trigger 114 reaches a position that activates the motor 108.

As used herein, the term "coupled" can mean any physical, electrical, magnetic, or other connection, either direct or indirect, between two parties. The term "coupled" is not limited to a fixed direct coupling between two entities.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims when viewed in their proper perspective based on the prior art.

What is claimed is:

1. A reversing mechanism for a tool having a motor adapted to drive a ratchet mechanism in either one of first and second rotational drive directions, the reversing mechanism comprising:

a toggle trigger operably coupled to the motor and the ratchet mechanism and rotatable in first and second toggle directions, wherein:

initial rotation of the toggle trigger in the first toggle direction causes the ratchet mechanism to select the first rotational drive direction, and further rotation of the toggle trigger in the first toggle direction causes the motor to drive the ratchet mechanism in the first rotational drive direction, and initial rotation of the toggle trigger in the second toggle direction causes the ratchet mechanism to select the second rotational drive direction, and further rotation of the toggle trigger in the second toggle direction causes the motor to drive the ratchet mechanism in the second rotational drive direction.

2. The reversing mechanism of claim 1, further comprising a linkage operably coupling the toggle trigger to the ratchet mechanism.

3. The reversing mechanism of claim 2, wherein the toggle trigger includes a stem portion that is disposed in a slot of the linkage.

4. The reversing mechanism of claim 3, wherein initial rotation of the toggle trigger in the first toggle direction causes the stem portion to push the linkage and cause the ratchet mechanism to select the first rotational drive direction, and initial rotation of the toggle trigger in the second toggle direction causes the stem portion to pull the linkage to cause the ratchet mechanism to select the second rotational drive direction.

5. A tool, comprising:

a ratchet mechanism;

a motor operably coupled to the ratchet mechanism and adapted to cause the ratchet mechanism to rotate in either one of first and second rotational drive directions;

a toggle trigger operably coupled to the motor and ratchet mechanism, and rotatable in first and second toggle directions, wherein:

initial rotation of the toggle trigger in the first toggle direction causes the ratchet mechanism to select the first rotational drive direction, and further rotation of the toggle trigger in the first toggle direction causes the motor to cause the ratchet mechanism to rotate in the first rotational drive direction, and initial rotation of the toggle trigger in the second toggle direction causes the ratchet mechanism to select the second rotational drive direction, and further rotation of the toggle trigger in the second toggle direction causes the motor to cause the ratchet mechanism to rotate in the second rotational drive direction.

6. The tool of claim 5, further comprising motor speed circuitry operably coupled to the toggle trigger and the motor.

7. The tool of claim 5, further comprising a linkage operably coupling the toggle trigger to the ratchet mechanism.

8. The tool of claim 7, wherein the toggle trigger includes a stem portion that is disposed in a slot of the linkage.

9. The tool of claim 8, wherein initial rotation of the toggle trigger in the first toggle direction causes the stem portion to push the linkage and cause the ratchet mechanism to select the first rotational drive direction, and initial rotation of the toggle trigger in the second toggle direction causes the stem portion to pull the linkage to cause the ratchet mechanism to select the second rotational drive direction.

10. The tool of claim 5, wherein the ratchet mechanism includes a selector lever, wherein initial rotation of the toggle trigger in the first toggle direction causes rotation of the selector lever to select the first rotational drive direction, and initial rotation of the toggle trigger in the second toggle direction causes rotation of the selector level to select the second rotational drive direction.

11. The tool of claim 5, wherein the ratchet mechanism includes a cam, wherein initial rotation of the toggle trigger in the first toggle direction causes rotation of the cam to select the first rotational drive direction, and initial rotation of the toggle trigger in the second toggle direction causes rotation of the cam to select the second rotational drive direction.

12. A reversing mechanism for a tool having a motor adapted to drive a ratchet mechanism in either one of first and second rotational drive directions, the reversing mechanism comprising:

a toggle trigger operably coupled to the motor and the ratchet mechanism and rotatable in first and second toggle directions, wherein each of the first and second toggle directions has first and second positions, and wherein:

rotation of the toggle trigger to the first position of the first toggle direction causes the ratchet mechanism to select the first rotational drive direction, and rotation of the toggle trigger to the second position of the first toggle direction causes the motor to drive the ratchet mechanism in the first rotational drive direction, and rotation of the toggle trigger to the first position of the second toggle direction causes the ratchet mechanism to select the second rotational drive direction, and rotation of the toggle trigger to the second position of the second toggle direction causes the motor to drive the ratchet mechanism in the second rotational drive direction.

13. The reversing mechanism of claim 12, further comprising a linkage operably coupling the toggle trigger to the ratchet mechanism.

14. The reversing mechanism of claim 13, wherein the toggle trigger includes a stem portion that is disposed in a slot of the linkage.

15. The reversing mechanism of claim 14, wherein rotation of the toggle trigger to the first position of the first toggle direction causes the stem portion to push the linkage and cause the ratchet mechanism to select the first rotational drive direction, and rotation of the toggle trigger to the first position of the second toggle direction causes the stem portion to pull the linkage to cause the ratchet mechanism to select the second rotational drive direction.

* * * * *